United States Patent [19]

Granella

[11] Patent Number: 5,515,886
[45] Date of Patent: May 14, 1996

[54] METHOD AND APPARATUS FOR REPAIRING A JUNCTION PIPE CONNECTION TO A MAIN PIPE

[75] Inventor: Bruno Granella, Brugg, Switzerland

[73] Assignee: Hydrostress AG, Pfäffikon, Switzerland

[21] Appl. No.: 173,067

[22] Filed: Dec. 27, 1993

[30] Foreign Application Priority Data

Jan. 1, 1993 [CH] Switzerland ............... 00001/93

[51] Int. Cl.⁶ ........................... F16L 55/162
[52] U.S. Cl. .................. 138/98; 138/97; 15/104.09
[58] Field of Search ............. 138/97, 98; 15/104.09, 15/104.16, 104.05, 104.03; 51/245

[56] References Cited

U.S. PATENT DOCUMENTS

| | | | |
|---|---|---|---|
| 3,168,908 | 2/1965 | Zurbrigen et al. | 138/97 |
| 3,950,461 | 4/1976 | Levens | 138/97 |
| 4,044,749 | 8/1977 | Bowen et al. | 138/97 |
| 4,245,970 | 1/1981 | St. Onge | 138/97 |
| 4,601,133 | 7/1986 | Gebald et al. | 15/104.09 |
| 4,657,449 | 4/1987 | Marich et al. | 15/104.09 |
| 4,986,314 | 1/1991 | Himmler | 138/97 |
| 5,040,922 | 8/1991 | Himmler | 138/97 |

FOREIGN PATENT DOCUMENTS 3119360 12/1982 Germany ............... 138/98
3911267 10/1990 Germany.

*Primary Examiner*—David Scherbel
*Assistant Examiner*—James F. Hook
*Attorney, Agent, or Firm*—Wenderoth, Lind & Ponack

[57] ABSTRACT

The connection between a residential junction pipe or the like and a sewer pipe is repaired by a cutter head that is led into the junction pipe and operates essentially with its front face. Thereby, it is unnecessary to locate junction pipes in a replaced sewer pipe as is the case with known methods. The cutter head is fastened at the front end of a flexible shaft. A feeding device feeds the cutter head during cutting. A fastening mechanism centers the device in the pipe to be worked. The cutter head includes an eccentric head rotatable about the center axis of the pipe and a cutter wheel that is rotatably supported in the eccentric head that moves in a circular orbit in the pipe. The fastening mechanism includes three radially adjustable supporting elements and a hydraulic piston-cylinder unit pressing the supporting elements against an inner wall of the pipe. After fastening of the supporting elements, the cutter head is moved by the feeding device in the pipe to achieve cutting.

15 Claims, 1 Drawing Sheet

METHOD AND APPARATUS FOR REPAIRING A JUNCTION PIPE CONNECTION TO A MAIN PIPE

BACKGROUND OF THE INVENTION

The invention relates to a method for repairing, in particular, a residential lateral or junction sewer pipe, during which method a plugged pipe or connection between a residential junction pipe, a factory junction pipe or the like and main sewer pipe is repaired by means of a cutter head. Furthermore the invention relates to a device or apparatus to carry out such method.

With a known method (DE-A1 39 11 267), there is led into a repaired sewer pipe a controllable and maneuverable cutter head. From the interior of the sewer pipe repaired by a hardened plastics pipe, the cutter head mills out an opening into the region of a lateral or junction sewer pipe, the diameter of such opening corresponding to that of the junction pipe. The cutting process is controlled from outside the sewer pipe with the assistance of a television camera led into the pipe, whereby the location of the junction pipe can be determined because of a buckling that occurs in a plastic tube that repairs the pipe. But, a concrete material often is used for repaired sewer pipe. In such case, it is impossible to determine the location of the junction pipe by a television camera. This can only be achieved by a trial and error test procedure, whereby the junction often can be located only after several failed trials. Moreover, the cutter head employed in such known process is only suitable for milling plastic tubes but not massive concrete walls.

SUMMARY OF THE INVENTION

Accordingly, the object of the present invention is to provide a method and an apparatus of the above type, but with which a junction of a lateral or junction pipe or the like with a repaired sewer pipe can be located in an efficient and fast manner and without trial and error. Moreover, the apparatus of the invention to carry out the method enables an efficient milling of sewer pipes that mostly are provided as reinforced concrete pipes at the present time.

Such object is achieved in accordance with the present invention, in that repair is made by a cutter head that is led into the junction pipe and that works or cuts substantially with its front face.

In such manner, the location of junction pipes in a repaired sewer pipe becomes necessary. In a repaired sewer pipe, there have to be reinstated or reformed openings from several junction pipes into the sewer pipe. At the present time, a sewer pipe is repaired by cutting away the old damaged pipe and inserting a new pipe directly behind a remaining section of the old pipe to be worked. In comparison to known processes, the present invention achieves a considerable saving of operating time, and moreover, if it is intended to repair the junction pipe, such pipe can be inspected and if necessary cleaned and repaired throughout its entire length.

The cutter head is connected with a flexible shaft which leads from the outside of the junction pipe, through the junction pipe, and which preferably is used to push and drive the cutter head.

The condition of the junction pipe advantageously can be determined by use of a television camera. Afterwards, but prior to repair, the junction pipe is solidified in its frontal or junction area by means of injecting concrete or the like. Thereby, on the one hand the cutter head is better guided during the cutting operation until cutting into the sewer pipe is reached, and on the other hand the connection of the junction pipe to the main pipes is surrounded with concrete and as a result the pipes are ready for normal use after the cutting operation.

The apparatus of the invention, including the head fastened to a front end of the flexible shaft, also includes a feeding device and a fastening mechanism that can be centered in the pipe to be worked. In this manner the cutter head can be introduced, for instance, from a manhole into a junction pipe without difficulty and further it can be pushed up to the closed junction with the repaired sewer pipe. Thereupon, the fastening mechanism is activated from outside, whereby the connected cutter head is centered and fastened in the pipe. The feeding device, which is advantageously arranged inwardly of the fastening mechanism, enables a forward movement of the cutter head and a rotating cutter wheel carried thereby until the opening at the junction into the sewer pipe os reformed.

BRIEF DESCRIPTION OF THE DRAWINGS

An embodiment and further advantages of the invention are explained in detail below with reference to the drawings, wherein.

DETAILED DESCRIPTION OF THE INVENTION

Figure 1:
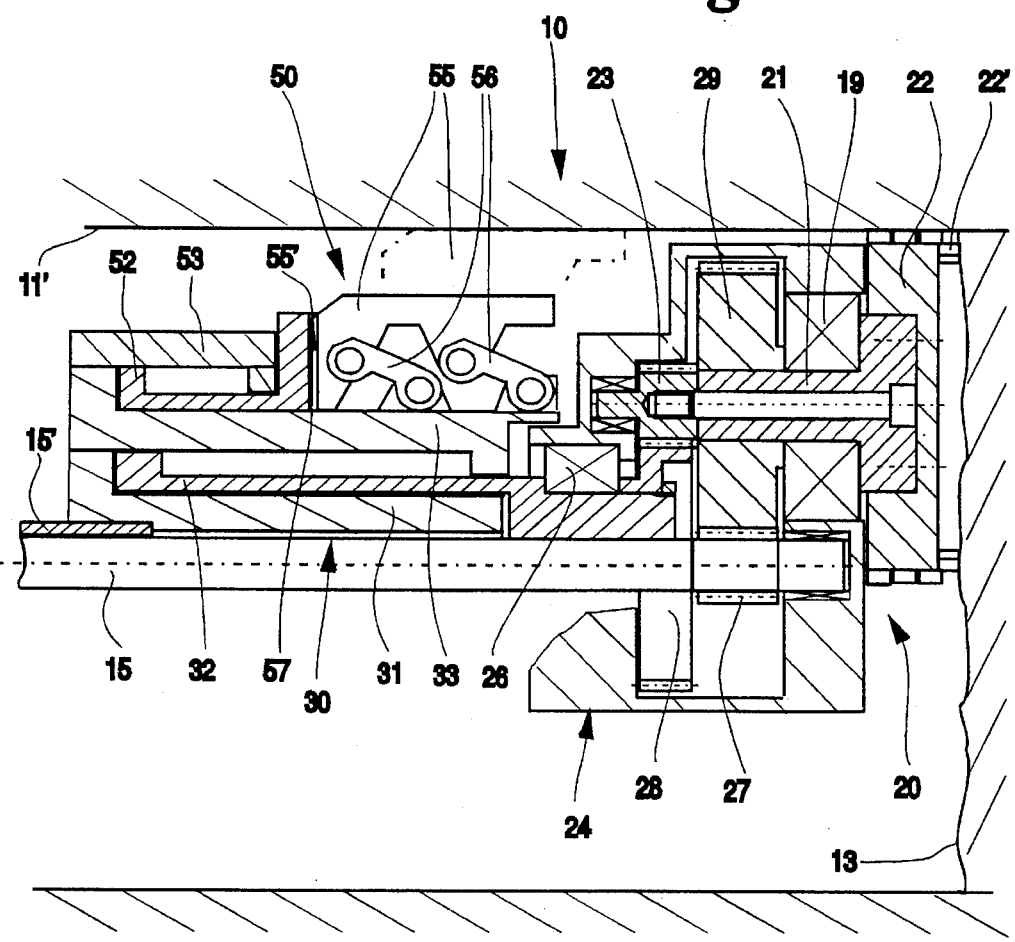
FIG. 1 is a schematic, longitudinal view of a device of the invention, with a fastening mechanism and feeding device shown in half view.

FIG. 1 shows a device 10 of the invention including a flexible shaft 15, at an end of which is fastened a cutter head 20. A feeding device 30 rotatably bears on head 20 and a fastening mechanism 50 is held by the feeding device. The feeding device formed as a hydraulic piston-cylinder unit 31, 32, 33, which is more or less the core part of the device 10. Annular piston 32 acts on the rotatable cutter head 20. In the illustrated position, the piston 32 is in its retracted position. The maximum stroke of piston 32 defines the possible amount by which the head 20 may be fed. The shaft 15 is mounted rotatably within the piston 32 and includes a rotatable steel string. An envelope or jacket 15 encloses the steel string and has fixed to ends enable guiding of the shaft 15. In this manner sufficient stability of the shaft is possible to enable sure pushing of the device 10 up to the junction of a pipe. Envelope 15' is mounted at the inner cylinder 31 of the unit. The piston 32 is sealingly guided between cylinder 31 and the outer cylinder 33.

The fastening mechanism 50 includes a hydraulic piston-cylinder unit 52, 53, three supporting elements 55 radially adjustable by unit 52, 53, with elements 55 being circumferentially spaced from one another by angles of 120°, and connecting links 56 flexibly supporting elements 55. Each element 55 is guided in a radial guide 57, e.g. a dovetail guide on face 55' of annular piston 52. Each element 55 is radially movable therein and pivotally supported by the two connecting links 56. The supporting elements 55 are operable to be pressed against an inner wall 11' of a lateral pipe 11 by the piston-cylinder unit 52, 53 with such force that the feeding device 30 is maintained immovable and concentrically positioned in the pipe 11, even when axial forces arise during the cutting operation. The outer surfaces of the support elements 55 that contact the inner wall 11' of the pipe are roughened for better adhesion and have radial shapes generally corresponding to the shape of the inner wall 11'. Not illustrated lines lead from the piston-cylinder unit 52, 53 and from the feeding device 30 to a pump and to a control device positioned outside of the pipe or in a manhole and enable appropriate control of operation thereof.

The cutter head 20 is positioned rotatably at the front side of the piston 32, as mentioned above, and includes an eccentric head 24 and a cutter wheel 22. Cutter wheel 22 is rotatably supported in a sleeve bearing 19 of the eccentric head 24. Head 24 has an oval housing 25 that is rotatably supported on a sleeve bearing 26 of the piston 32 and includes therein a gear drive. The shaft 16 extends through the annular piston-cylinder unit 31, 32, 33 into the housing 25 and has mounted in series thereon two pinion gears 27, 28 of the gear drive. The smaller pinion gear 27 is in meshing engagement with a planet pinion gear 29 supported in the outer or upper part of the housing 25 and mounted on a drive shaft 21 of the cutter wheel 22. The larger pinion gear 28 is in meshing engagement with a smaller gear 23 which also is arranged in the housing 25 and is fixed to shaft 21 to drive the cutter wheel 22. When the shaft 15 is rotated by a motor outside of the lateral junction pipe 11, then the gear wheel 23 and therewith the planet pinion 29 as well as the cutter wheel 22 are set in rotation at a speed dependent on the speed of the shaft 15 and the rear ratios of the gear train. Because the planet pinion 29 rotates faster than the pinion 27, the eccentric head 24 and the housing 25 thereof additionally are rotated about the axis of the piston 32 and therewith that of the pipe 11. Consequently, the cutter wheel 22, with a diameter larger than the radius of the pipe, mills the entire front face 13 of a repair plug at the junction of the pipe 11. The interchangeable cutter wheel 22 has circumferential as well as front face diamond tipped cutting teeth 22', as is common for concrete cutter tools. The cutter head could also employ a cutter wheel that has a diameter such that a milling operation results in enlargement of the pipe. Thereby, a connecting pipe with the same inner diameter as the pipe 11 can be inserted subsequently.

Furthermore, water can be injected by a separate water pipe to cool the cutter wheel and to convey or to exhaust from the pipe materials generated by the milling procedure. Since the device 10 fills only part of the cross section of the pipe, such materials easily can be washed away.

With the above described construction of the device 10 according to the invention there results a further advantage in that the complete front face 13 of the repair plug at the junction with pipe 11 can be worked, even though with the supporting elements 55 retracted the device has an outer diameter of the eccentric head 24 that is not greater than at about 70% of the diameter of the pipe 11. Further, the width is even smaller than the outer diameter because of the oval form of the head. In this manner the device 10 as a whole can be moved through the pipe 11, even when pipe 11 has one or several curves. Also, longitudinal movement of the device is improved because it has a relatively short length. Because of these advantages, the device according to the invention is much improved over prior art solutions.

The construction of device 10 could be different. For instance, the drive of the cutter wheel could be directly included between the eccentric head, but this would result in enlargement of dimensions. Furthermore, instead of the hydraulic feed device, there could be used in principal a rack-and-pinion gear feed device.

The supporting elements of the fastening mechanism could be individually radially adjusted. Therewith, the feeding device as well as the shaft would be eccentrically adjustable to the junction pipe, and the cutter head could then be directly driven by the shaft and concentrically arranged thereto. For the disclosure of the invention, the presented version is sufficient.

Also, the field of application of the device 10 is not limited to repair of residential junction pipes or facilities in industrial plants. Device 10 also could be employed for cleaning such pipes if they are plugged or even for the production of not too long full bored holes, or other respective applications. The term residential junction pipe includes junction pipes of houses or buildings of every type as well as junction pipes of factories or of other industrial buildings.

Figure 2:
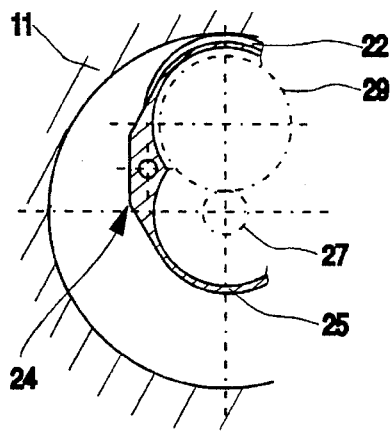
FIG. 2 is a schematic cross sectional view of a cutter head of the device according to FIG. 1.

FIG. 2 shows the eccentric head 24 in transverse cross sectional. The relationship of external dimensions of head 24 to the diameter of the pipe 11 is illustrated, and it is apparent that device 10, because of its compact structural design, can be led into pipes that are even greatly curved. Such junction pipes commonly have diameters of 150, 200 or 250 millimeters. Particular for pipes of 250 millimeters, it is useful to employ larger cutter wheels than for pipes with smaller diameters, to which the hydraulic drive could be preferably arranged in the eccentric head or behind the fastening mechanism instead of an external drive with the drive shaft.

Figure 3:
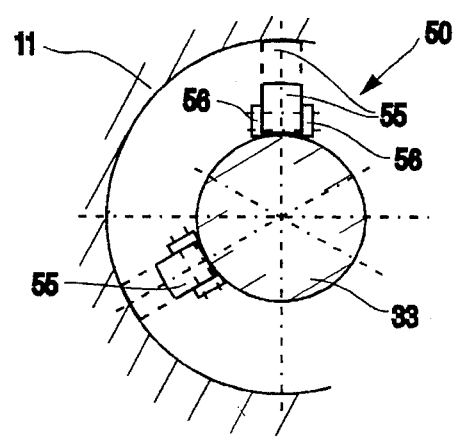
FIG. 3 is a schematic cross sectional view illustrating operation of the fastening mechanism of the device according to FIG. 1.

FIG. 3 illustrates the three point support in pipe 11 formed by the supporting elements 55. Therein is shown the identical angular spacing of 120° between adjacent supporting elements. Thereby, satisfactory fastening of the device 10 in the pipe is achieved. However, two or more than three such supporting elements could be provided.

Thus, the center of rotation of the cutter head could be used at an angle of 45° to that of the pipe, and the cutter head still would be in rotating connection with the driven shaft. Thereby, upon rotation of the shaft the cutter wheel mills the complete inner wall of the pipe. The feeding device could be formed in such a manner that the shaft, connected with the cutter head and longitudinally guided in the device, would likewise guide the cutter head in the longitudinal direction against the fastening device fixed in the pipe, instead of the piston-cylinder unit illustrated.

In accordance with the method of the invention, first the condition of the junction pipe 11 is determined, preferably by means of a television camera led therein. After a concrete emulsion is injected into the area of junction and after setting thereof, the cutter head and the device 10 in the initial position of the supporting elements 55 and the piston 32 as shown in FIG. 1 are introduced into and moved along the pipe 11 by pushing the shaft 15 from outside the pipe. Thereby, the shaft 15 and the hydraulic lines of the piston-cylinder units 31, 32, 33 and 52, 53 can be covered in a waterproof tube. As soon as the device is positioned attaining the front of the pipe covered by the repair plug of the repaired sewer pipe, the supporting elements 55 are extended to fasten the device in position. Then, the rotation drive of the shaft 15 is switched on, and the rotating cutter wheel 22 will be moved at a defined feed rate against the front side 13 of the repair plug at the junction of pipe 11. If, after the maximum stroke of the feeding device 30, the area to be cut into the sewer pipe is not yet reached, then the supporting elements 55 will be loosened and subsequently the device 10 can be moved forward again by the mentioned stroke. Then, the explained procedure can be repeated. After the opening into the sewer pipe is reinstated, it might be useful that the milled section of pipe 11, depending on its condition, be finished or sealed by injecting concrete again or by inserting a connecting pipe therein.

I claim:

1. A method of repairing a lateral pipe and a junction between said lateral pipe and a main pipe by reforming an opening therebetween through a repair plug at said junction, said method comprising:

introducing into said lateral pipe, from a location exterior thereof, a flexible shaft having mounted eccentrically thereon a cutter head, until said cutter head reaches said repair plug;

actuating a fastening mechanism mounted about said flexible shaft to fixedly position said fastening mechanism relative to said lateral pipe and to fix said flexible shaft radially relative to said lateral pipe; and operating said cutter head to move said cutter head about a longitudinal center axis of said flexible shaft while moving said cutter head and said flexible shaft axially relative to said fastening mechanism toward said repair plug, and thereby cutting away material of said repair plug by said cutter head, and thereby reforming said opening.

2. A method as claimed in claim 1, wherein said fastening mechanism comprises plural supporting elements spaced circumferentially about said flexible shaft, and said actuating comprises moving said supporting elements radially outwardly from said flexible shaft into engaging contact with said lateral pipe.

3. A method as claimed in claim 1, wherein said cutter head includes a cutter wheel rotatable about an axis eccentric to said longitudinal center axis, and said operating further comprises moving said axis of said cutter wheel in an orbit about said longitudinal center axis while rotating said cutter wheel about said axis thereof.

4. A method as claimed in claim 1, wherein said actuating centers said flexible shaft within said lateral pipe.

5. An apparatus for repairing a lateral pipe and a junction between the lateral pipe and a main pipe by reforming an opening therebetween through a repair plug at the junction, said apparatus comprising:

a flexible shaft capable of being introduced into the lateral pipe from a location exterior thereof;

a cutter head mounted eccentrically on an end of said flexible shaft;

a fastening mechanism mounted about said flexible shaft and operable to, when said cutter head has been moved with said flexible shaft to a repair position within the lateral pipe at the repair plug, be fixedly positioned relative to the lateral pipe and fix said flexible shaft radially relative to the lateral pipe; and a feeding device on said fastening mechanism and operable to move said cutter head and said flexible shaft axially relative to said fastening mechanism toward the repair plug, whereby as said cutter head is operated said cutter head cuts into the repair plug and reforms the opening.

6. An apparatus as claimed in claim 5, wherein said fastening mechanism comprises plural supporting elements spaced circumferentially about said flexible shaft and mounted for movement radially outwardly thereof.

7. An apparatus as claimed in claim 6, wherein said supporting elements are operable to be brought into contact with the lateral pipe to fixedly center said flexible shaft relative thereto.

8. An apparatus as claimed in claim 6, wherein said fastening mechanism further comprises means mounted about said said flexible shaft for movement axially thereof to actuate said supporting elements to move radially thereof.

9. An apparatus as claimed in claim 8, wherein said means comprises a piston-cylinder unit.

10. An apparatus as claimed in claim 5, wherein said feeding device comprises a piston-cylinder unit.

11. An apparatus as claimed in claim 5, wherein said feeding device is mounted about said flexible shaft radially inwardly of said fastening mechanism.

12. An apparatus as claimed in claim 5, wherein said cutter head includes a cutter wheel rotatable about an axis eccentric to a longitudinal center axis of said flexible shaft.

13. An apparatus as claimed in claim 12, further comprising means for rotating said cutter head eccentrically about said longitudinal center axis such that said axis of said cutter wheel moves in an orbit about said longitudinal center axis and for rotating said cutter wheel about said axis thereof.

14. An apparatus as claimed in claim 13, wherein said rotating means comprises a gear drive train between said flexible shaft, said cutter head and said cutter wheel, such that rotation imparted to said flexible shaft about said longitudinal center axis thereof results in said eccentric rotation of said cutter head and said rotation of said cutter wheel.

15. An apparatus as claimed in claim 5, wherein said cutter head has a dimension in a diametral direction to be between 50% and 70% of the diameter of the lateral pipe.

* * * * *